April 6, 1948.                J. R. C. QUILTER                2,439,318
                               PARACHUTE PACK
                             Filed May 13, 1946              3 Sheets-Sheet 3

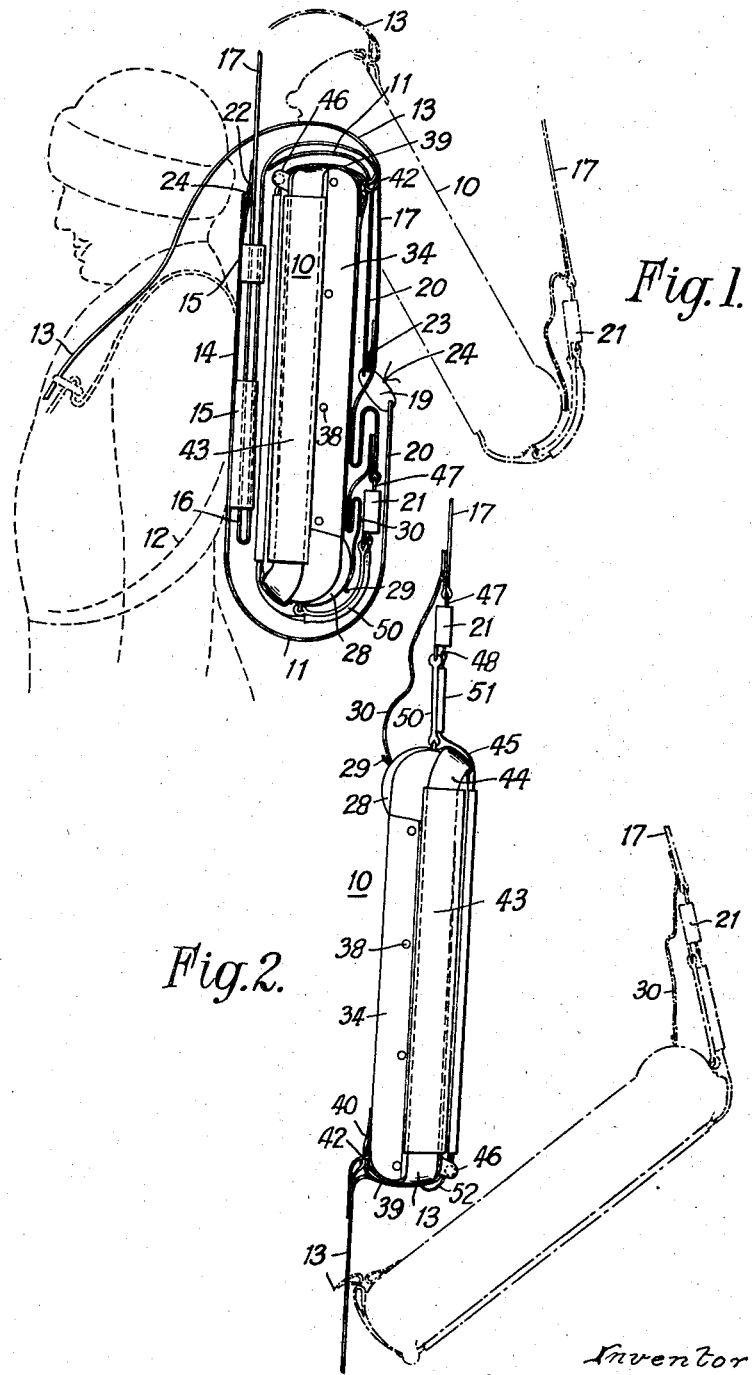

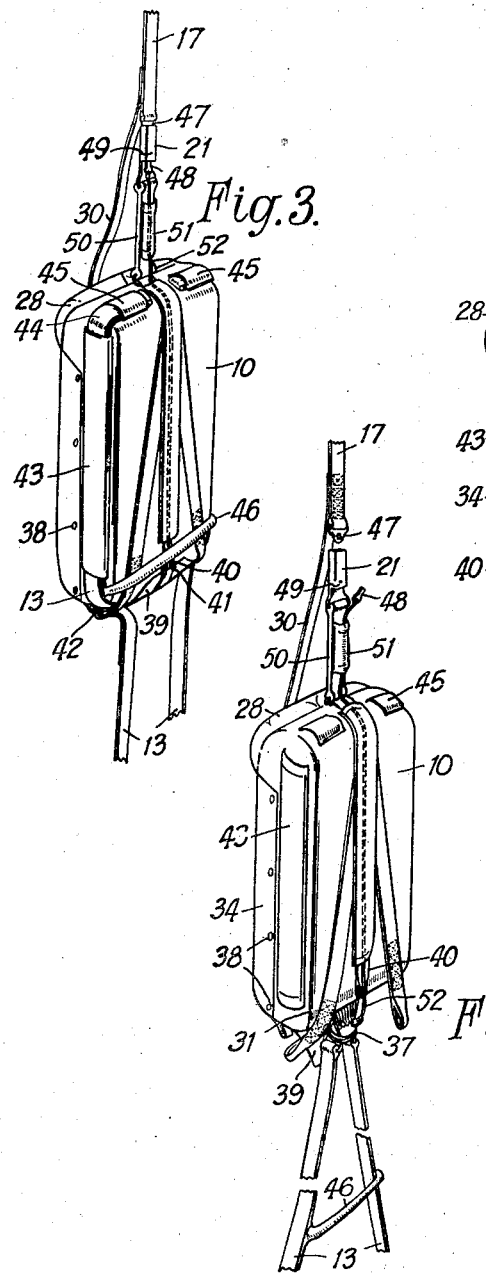

Inventor
John Raymond Cuthbert Quilter
by: John M Graham
HIS AGENT.

Patented Apr. 6, 1948

2,439,318

UNITED STATES PATENT OFFICE 2,439,318

PARACHUTE PACK

John Raymond Cuthbert Quilter, Woking, England

Application May 13, 1946, Serial No. 669,328
In Great Britain May 4, 1945

Section 1, Public Law 690, August 8, 1946

9 Claims. (Cl. 244—148)

This invention relates to parachute packs of the kind adapted for release by a static line attached to the aircraft from which the descent is made; a parachute pack of this kind is described in the prior Patent No. 2,396,126, issued March 5, 1946, of which I am one of the patentees.

The present invention has for its primary object to provide an improved parachute pack of this kind, adapted for employment at high flying speeds, one of the most important features being that the deployment of the static line and other connections takes place in a substantially straight line and not in the usual curvature of the known parachute packs.

Another object of the invention is to provide an improved parachute pack of the kind described above, which is free from the usual drawback of leaving an empty container dangling from the static line and thereby possibly causing damage to the aircraft as well as inconveniencing other parachutists who are to follow, and also avoids the delay required for drawing an empty container up into the aircraft out of the way for the next parachutist to descend.

More specifically, it is an object of the present invention to provide an improved parachute pack of the kind described above, in which a main parachute canopy, its shroud lines and an auxiliary or retarder parachute are stowed in a container which is detachably connected to the aircraft by a static line, the connection being released by a trip device prior to the extraction of the main parachute, and the auxiliary or retarder parachute being then brought into action to support the container and retard its further descent while the main parachute is extracted by the pull of the parachutist's weight upon its shroud lines.

Other objects and advantages of the present invention will hereinafter appear from the following description of a preferred embodiment, given with reference to the accompanying drawings, in which:

Fig. 1 shows the improved parachute pack or container enclosed in a cover attached to the harness ready for the wearer to jump from an aircraft (not shown) to which the static line is connected.

Fig. 2 shows the pack released from the cover and inverted by the pull of the static line, Fig. 3 being a perspective view of the pack in this condition.

Fig. 4 is another perspective view showing the main lift webs withdrawing by the weight of the parachutist.

Fig. 5 is a similar view showing the webs completely withdrawn, the mouth of the pack opening for the shroud lines to emerge, and the static line being released by a rip cord actuated by the swivel of the shroud lines.

Figure 6:
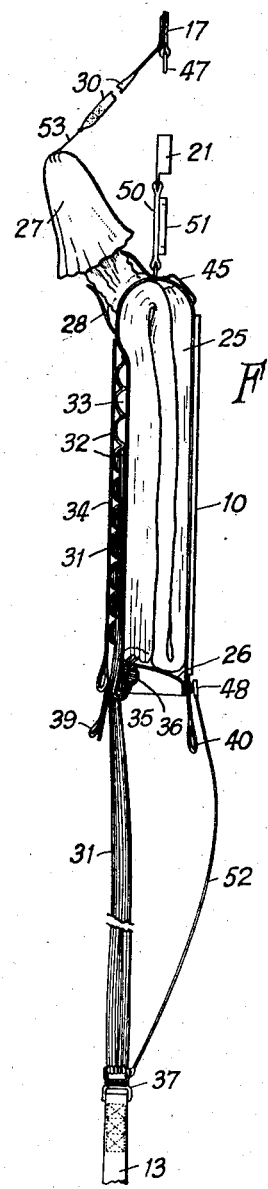
Fig. 6 shows the shroud lines withdrawing from the container while an auxiliary or retarder parachute is withdrawn from the upper end by a connection from the released static line.

Referring to Fig. 1 of the drawings, the container 10, which is conveniently made of rectangular shape, is normally enclosed in an outer bag or cover 11 attached to the harness 12 of the parachutist, whose main lift webs 13 are stowed upon the pack as hereinafter described.

The outer bag or cover 11, which is normally closed until the initial tensioning of the static line, may consist of flexible and waterproof material, such as canvas, having a front panel 14 stiffened by a light wire frame or other insert, this panel carrying externally suitable attachments for connection to the harness 12 worn by the parachutist; on the inner face of this panel, one or more pockets 15 are provided into which a loose length or loop 16 of the static line 17 connected to the aircraft can be dropped through an opening at the top of the panel, in the inverted position of wear, as seen in Fig. 1. The projecting end of the static line will carry a shackle or other means (not shown) for attachment to the aircraft, while the free end of the line 17 passes over the top of the bag 11 and down to about the middle of the back where it enters through a gap 19 between the cover flaps 20 of the bag and is attached to a trip device 21 standing near the bottom of the inverted container; two spaced beckets 22, 23 upon the static line engage with frangible ties 24 at front and back of the outer bag, the front one serving to keep the looped length of the line in position in the pockets 15, and the back one serving to maintain the cover flaps 20 of the outer bag in closed position.

The main parachute 25 is stowed inside the container 10, within a compartment of which the mouth is normally closed by a flap 26 (see Fig. 6), this mouth being at the upper end of the container in the position of Fig. 1; the auxiliary parachute 27 is stowed in a small separate compartment at the other end of the container, this compartment being normally covered by flaps 28 secured by a frangible tie 29. The latter is engaged by a flexible connection 30 attached to the static line 17.

The main shroud lines 31 are stowed in zigzag fashion in two rows of looped retaining tapes 32 aligned along the vertical edges of a board 33 forming the front of the container, a hinged cover flap 34 being brought over the stowed shroud lines so as to form a closed compartment for them; after the main parachute 25 has been stowed in its compartment of the container, the mouth of the compartment is closed by the flap 26 which has two slots 35 engaging with two loops 36 on the back of the board, as seen in Fig. 6. The first portions of the shroud lines 31 to be stowed are engaged with these two loops 36 so as to lock the closure flap 26 over the parachute, and the remainder of the shroud lines are then stowed zigzag in the retaining loops 32 on the front of the board, until they reach the top end, from which they return straight down to the mouth end; their swivel 37 or other connection to the lift webs 13 is normally accommodated just inside the container, the hinged cover flap 34 being then closed down, for example by press-studs 38 along the vertical edges of the container. A triangular extension 39 of this cover flap is then folded across beneath the locked bottom flap 26 of the paratchute compartment and secured to a loop 40 on the back of the container by a frangible cord tie 41 engaging the swivel 37 of the shroud lines.

The lift webs 13 are carried from the bottom of the container, on opposite sides of the triangular cover-flap extension 39, beneath a pair of frangible ties 42 which normally retain the webs in two guide channels or pockets 43 running up the opposite sides of the container, the lift webs being looped upwards through these channels and the ends of the loops 44 threaded into two short tunnels or pockets 45 on the top; the return lengths of the lift webs are cross-connected by a spacer bar 46 at the lower ends of the guide channels, beyond which they are left free for attachment to the harness.

The detachable connection of the static line 17 to the container is effected at the end remote from the mouth of the compartment in which the main parachute 25 is stowed; this end forms the top of the container during the downward extraction of the parachute from the mouth, although it lies at the bottom of the outer bag 11 in the inverted position of the container as worn, in the position of Fig. 1. The detachable connection comprises a lug 47 secured to the static line and engageable with the trip locking device 21, a sliding plunger 48 holding the trip device in engagement with the lug, and a shear wire or tie 49 locking the plunger in the holding position; the trip device 21 is secured to the end of the container, as by a short length of webbing 50, to which is fastened a guide tube 51 for the plunger, the latter being connected to a rip cord 52 running down the back of the container towards the mouth of the parachute compartment. The lower end of the rip cord is attached to the swivel 37 of the shroud lines, so that as soon as the latter begin to emerge from their compartment after breaking the tie of the cover flap extension 39 they will actuate the rip cord to withdraw the plunger 48 of the trip device and thereby release the connector lug 47 of the static line.

Figure 7:
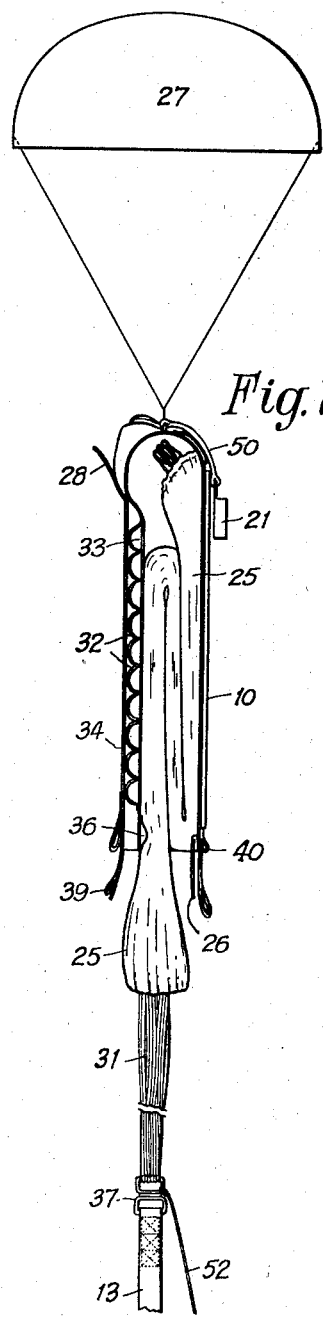
Fig. 7 shows the auxiliary parachute fully deployed and supporting the container while the shroud lines pull out the main parachute from its compartment.

In operation, when the parachutist jumps from the aircraft and the static line 17 draws tight, it first breaks the tie 24 at the front of the outer bag, so as to allow the looped length 16 to pull out, thus maintaining the deployed length of the line substantially straight, instead of being swept back by the airstream, as happens when the parachutist jumps with an ordinary pack connected to the aircraft by a slack static line of relatively great length. The static line, when fully deployed, then breaks the tie 24 at the back of the bag, so as to allow its cover flaps 20 to open; next, by pulling upon the trip device 21 secured by the webbing 50 to the lower end of the inverted container, it swings the latter backwards and upwards from the parachutist, as indicated in chain lines in Figs. 1 and 2, the other end of the container being held by the lift webs 13 which are stowed partly around the container in the vertical direction. When the semi-circular swing produced by these two opposing pulls is completed, the container 10 occupies the position shown in Fig. 2, and the tension applied to the webs 13 breaks the third tie 42 at the sides of the triangular cover flap extension 39 and pulls the looped portions 44 of the webs down from their pockets 43, 45, at the sides and top of the container; see Figs. 3 and 4. These looped portions being pulled out under tension, the deployed length of the lift webs will also be maintained substantially straight. After the looped portions have been pulled out from these pockets, the tension acts upon the swivel connection 37 so as to break the fourth tie 41 holding the triangular flap extension 39 beneath the main parachute compartment, and at the same time to operate the rip cord 52 controlling the plunger 49 of the detachable connection at the top of the container, as shown in Fig. 5. With the shroud lines 31 already emerging from the bottom, the static line 17 will break the shear wire or fifth tie 49 so that the plunger 48 allows the connector lug 47 to disengage from the trip device 21. On the release of the connector lug 47, the static line 17 pulls up the connection 30 which breaks the sixth tie 29, thereby releasing the cover flap 28 over the auxiliary or retarder parachute compartment, after which it pulls out the parachute canopy 27 by means of a frangible cord 53, as indicated in Fig. 6; this cord 53 now takes the strain of the load and breaks as soon as the retarder parachute 27 is fully withdrawn, thereby disconnecting the whole equipment from static line which remains attached to the aircraft. The retarder parachute 27 deploys in the air as the parachutist continues to fall, and when fully deployed it supports the container 10, while the main shroud lines 31 continue to emerge from the pack until the lock at the mouth of the main parachute compartment is reached; at that moment the shroud lines 31 break the canopy lock by pulling out of the two back loops 36 and freeing the flap 26, after which they proceed to withdraw the main parachute 25, as shown in Fig. 7. During this time, the auxiliary or retarder parachute 27 acts to support the container 10 by means of its rigging lines, and thereby retards the descent until the main parachute 25 has been wholly withdrawn and separated from the container; the parachute then pulls clear away from the container, leaving the latter to float off with the auxiliary or retarder parachute 27. Thereafter, the parachutist will descend in the normal manner, supported by the main parachute, while the empty container floats away supported by the retarder parachute; the static line remains connected to the aircraft, its loose end having only the connector lug 47 and connection 30 attached to it.

Throughout the deployment, the static line 17 and lift webs 13 remain in substantially straight alignment because they are not exposed to the airstream except in so far as they are under tension; initially, only a short length of static line is exposed, the further lengths being withdrawn from the pack only by the load tension pulling the loop 16 out of the pockets 15 and the continuation of the line from beneath the cover flaps 29, and similarly the looped portions of the lift webs 13 are pulled out of their pockets 43, 45 by the load tension. The deployment therefore takes place in a straight line from the aircraft until completely released, and both the retarder and the main parachutes will maintain this same alignment, thus avoiding the drawbacks of previous devices in which a whole length of static line and the canopy container attached thereto are exposed to the airstream before any tension is applied and also during deployment, with the result that the line and container are blown back and in rising are apt to flap against the aircraft and become dangerous at high speed because the apex of the emerging canopy is liable to strike the tail of the aircraft.

It will be understood that the various flaps, covers and retaining means to be opened in the course of the operation are normally kept closed by suitable ties or other frangible connectors of appropriate breaking strength, each connector being broken in turn as the pull is applied to a member through which the connector is threaded or to which it is otherwise connected.

What I claim is:

1. A parachute pack adapted for static release, comprising a container, means for connecting said container to an aircraft, said connecting means including a static line and a detachable connector, a trip device for releasing said detachable connector, a main parachute and shroud lines stowed in said container, an auxiliary parachute stowed in said container, frangible means for extracting said auxiliary parachute by the tension of said static line, means for extracting said shroud lines by the pull of the parachutist's weight, and means for operating said trip device by the initial withdrawal of said shroud lines prior to the extraction of said main parachute.

2. A parachute pack adapted for static release, comprising a container, a static line for connecting said container to an aircraft, a detachable connector interposed between said static line and said container, a trip device for releasing said detachable connector, a main parachute and shroud lines stowed in said container, an auxiliary parachute stowed in said container, means for extracting said shroud lines by the pull of the parachutist's weight, means for operating said trip device by the initial withdrawal of said shroud lines, and frangible means for extracting said auxiliary parachute by the tension of said static line substantially simultaneously with the release of said detachable connector, the final withdrawal of said shroud lines extracting said main parachute while said container remains supported by said auxiliary parachute.

3. A parachute pack adapted for static release, comprising a container, means for connecting said container to an aircraft, said connecting means including a static line and a detachable connector, a trip device for releasing said detachable connector, a main parachute and shroud lines stowed in said container, an auxiliary parachute stowed in said container, frangible means for extracting said auxiliary parachute by the tension of said static line, means for extracting said shroud lines by the pull of the parachutist's weight, said last-mentioned extracting means including at least one tensile member normally looped to reduce its exposed length, and means for operating said trip device by the initial withdrawal of said shroud lines prior to the extraction of said main parachute.

4. A parachute pack adapted for static release, comprising a container, means for connecting said container to an aircraft, said connecting means including a static line and a detachable connector, an outer cover for said container, said cover being attached to a parachutist's harness, a trip device for releasing said detachable connector, a main parachute stowed in said container, an auxiliary parachute stowed in said container, frangible means normally retaining said cover closed around said container, said frangible means being breakable by tension of said static line, means for extracting said auxiliary parachute by further tension of said static line, means for operating said trip device prior to extraction of said main parachute, and means for extracting said main parachute by the pull of the parachutist's weight while said container is supported by said auxiliary parachute.

5. A parachute pack adapted for static release, comprising a container, means for connecting said container to an aircraft, said connecting means including a static line and a detachable connector, an outer cover for said container, said cover being attached to a parachutist's harness, a trip device for releasing said detachable connector, a main parachute stowed in said container, an auxiliary parachute stowed in said container, frangible means normally retaining said cover closed around said container, said frangible means being breakable by tension of said static line, lift webs extending between the parachutist's harness and the shroud lines of said main parachute, said lift webs operating said trip device when tensioned by the parachutist's weight, and means for extracting said auxiliary parachute by further tension of said static line, the shroud lines extracting said main parachute under tension of said lift webs while said container remains supported by said auxiliary parachute.

6. A parachute pack adapted for static release, comprising a container, means for connecting said container to an aircraft, said connecting means including a static line and a detachable connector, a main parachute and shroud lines stowed in said container, an auxiliary parachute stowed in said container, an outer cover for said container, means for retaining said main parachute in said container, frangible means normally retaining said cover closed about said container, means worn by a parachutist for attaching said cover to his body, lift webs connected to said shroud lines for supporting the parachutist during a descent, said frangle means being breakable by tension of said static line to uncover said container, the uncovered container being then exposed to opposing pulls of said static line and lift webs, means operated by the pull of said lift webs for releasing the retaining means of said main parachute, other means operated substantially simultaneously by the pull of said lift webs to free said detachable connector, and frangible means operated by said static line after release of said detachable connector for extracting said auxiliary parachute, the pull of said lift webs continuing to withdraw said shroud lines and main parachute from said container while the deployed auxiliary parachute supports said container.

7. A parachute pack adapted for static release, comprising a container, means for connecting said container to an aircraft, said connecting means including a static line and a detachable connector, a main parachute and shroud lines stowed in said container, an auxiliary parachute stowed in said container, an outer cover for said container, means for retaining said main parachute in said container, frangible means normally retaining said cover closed about said container, means worn by a parachutist for attaching said cover to his body, lift webs connected to said shroud lines for supporting the parachutist during a descent, said frangible means being breakable by tension of said static line to uncover said container, the uncovered container being then exposed to opposing pulls of said static line and lift webs, said static line and lift webs being normally wound partly around said container but unwinding therefrom while it makes a partial rotation due to their opposing pulls, means operated by the pull of said lift webs to free said detachable connector, and frangible means operated by said static line after release of said detachable connector for extracting said auxiliary parachute the pull of said lift webs continuing to withdraw said shroud lines and main parachute from said container while the deployed auxiliary parachute supports said container.

8. A parachute pack adapted for static release, comprising a container, means for connecting said container to an aircraft, said connecting means including a static line and a detachable connector, a main parachute and shroud lines stowed in said container, an auxiliary parachute stowed in said container, an outer cover for said container, means for retaining said main parachute in said container, frangible means normally retaining said cover closed about said container, means worn by a parachutist for attaching said cover to his body, lift webs connected to said shroud lines for supporting the parachutist during a descent, said frangible means being breakable by tension of said static line to uncover said container, said static line including a looped portion normally enclosed within said cover but pulling out to full length under its initial tension, the uncovered container being then exposed to opposing pulls of said static line and lift webs, said static line and lift webs being normally wound partly around said container but unwinding therefrom while it makes a partial rotation due to their opposing pulls, means operated by the pull of said lift webs to free said detachable connector, and frangible means operated by said static line after release of said detachable connector for extracting said auxiliary parachute, the pull of said lift webs continuing to withdraw said shroud lines and main parachute from said container while the deployed auxiliary parachute supports said container.

9. In the parachute art, a method of static release, comprising the steps of increasing the lengths of the static line and lift webs exposed to the airstream as the load tension is applied to said static line and lift webs, freeing the main parachute retaining means and substantially simultaneously disconnecting the pack container from the static line by the load tension upon the lift webs, extracting an auxiliary parachute from the container by the final pull of the static line, and supporting the container by the deployed auxiliary parachute while the load tension upon the lift webs extracts the main parachute, leaving the empty container to float away with the auxiliary parachute.

JOHN RAYMOND CUTHBERT QUILTER.

REFERENCES CITED

The following references are of record in the file of this patent:

UNITED STATES PATENTS

| Number | Name | Date |
|---|---|---|
| 1,165,891 | Martin | Dec. 28, 1915 |
| 1,603,648 | Thornblad | Oct. 19, 1926 |
| 1,795,168 | Habermehl | Mar. 3, 1931 |
| 1,909,158 | Albihn | May 16, 1933 |